Figure 1:
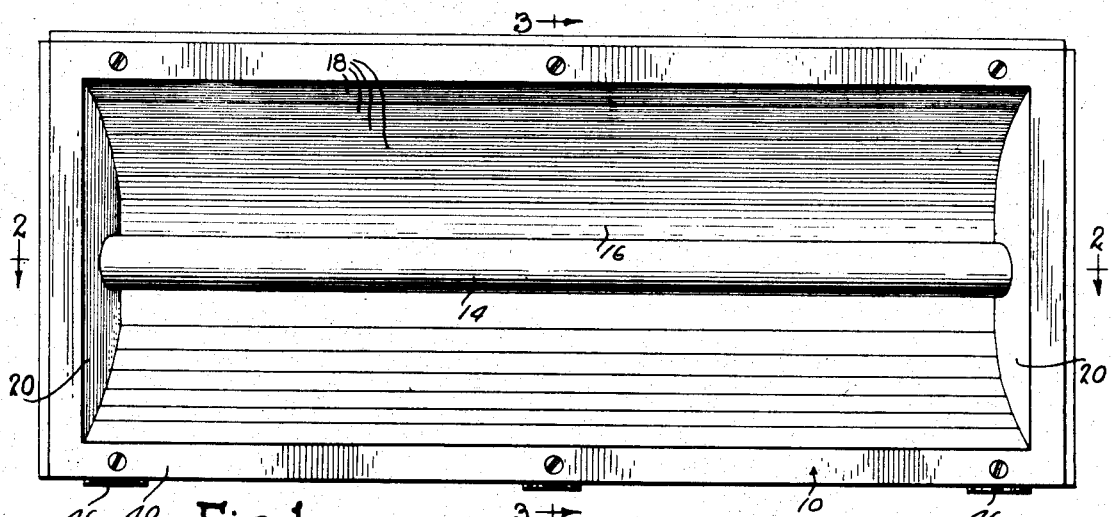

June 29, 1943.  R. B. NETTING  2,323,073
LIGHT REFLECTOR
Filed Dec. 30, 1940  3 Sheets-Sheet 1

INVENTOR.
Ralph B. Netting
BY Parker and Burton
ATTORNEYS

June 29, 1943.  R. B. NETTING  2,323,073
LIGHT REFLECTOR
Filed Dec. 30, 1940   3 Sheets-Sheet 2
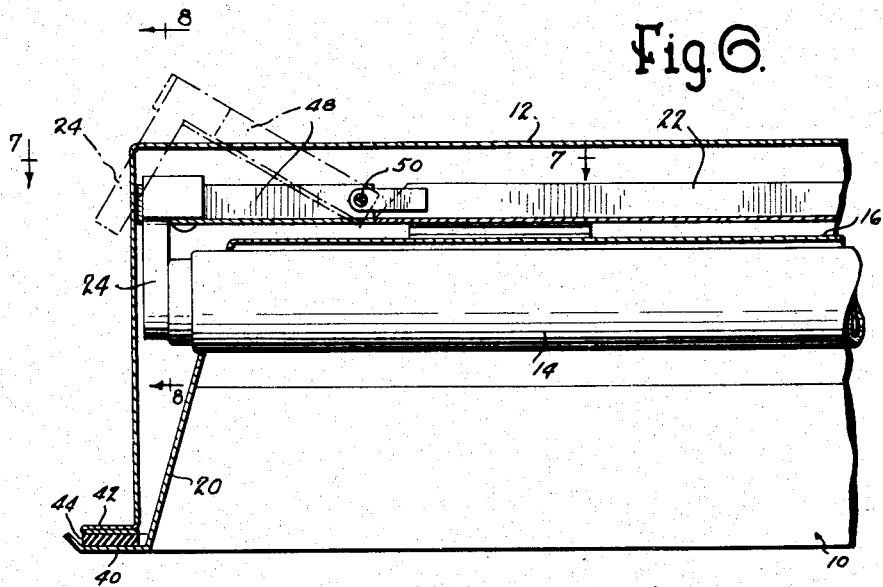
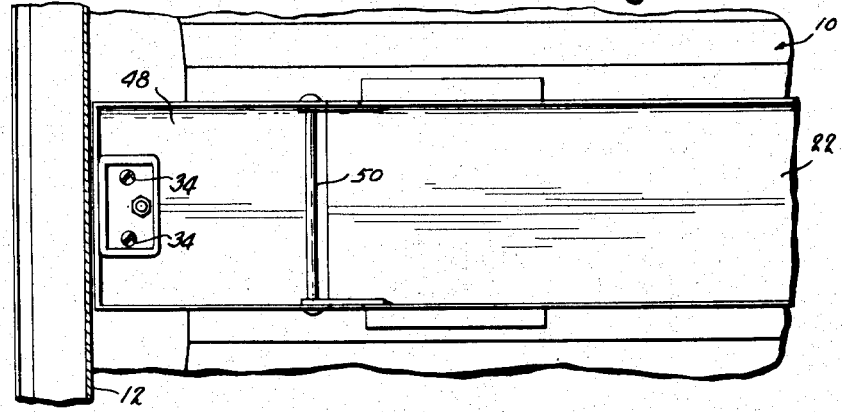
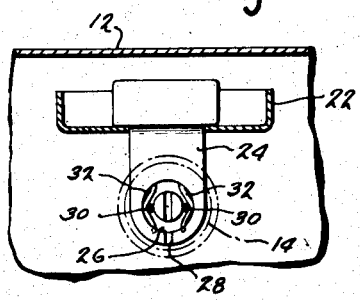
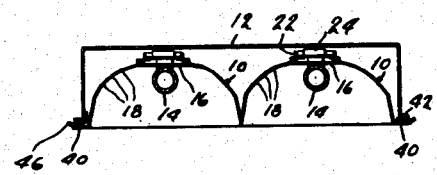
INVENTOR.
Ralph B. Netting
BY Parker and Burton
ATTORNEYS INVENTOR.
Ralph B. Netting
BY Parker and Burton
ATTORNEYS Patented June 29, 1943

2,323,073

UNITED STATES PATENT OFFICE 2,323,073

LIGHT REFLECTOR

Ralph B. Netting, Grosse Pointe, Mich.

Application December 30, 1940, Serial No. 372,305

2 Claims. (Cl. 240—78)

This invention relates to electric light fixtures and particularly to light fixtures utilizing fluorescent lamps and the like.

Heretofore, electric lighting fixtures utilizing gaseous or fluorescent types of lamps were generally made without care as to the creation of dark areas or spots on the reflecting surfaces. Usually the light source in these types of fixtures was not directly exposed to view when in use and accordingly it made very little difference whether shadows or dark areas were formed on the reflecting surface by the light emitted from the lamp. Either indirect lighting was practised or the direct rays of the fluorescent lamp was shielded by louvers, fins, screens, et cetera, or by mounting the lamps behind frosted or opal glass. Such constructions sacrificed efficiency and added to the cost of manufacture and installation.

In those cases where fluorescent light fixtures were used for general illumination and the light sources thereof were exposed to view, undesirable dark areas and spots were formed which not only detracted from the beauty of the lighted fixture but also because of the contrast between the light and dark areas were distasteful to the eyes. For example, shadow bands were formed on opposite sides of the lamp by placing the fluorescent tube in spaced relation to the reflecting surface. Intermediate dark areas also were formed on the curved reflecting surfaces because the curved surface did not bear the proper relation to the tube. The ends of the fluorescent lamp and the sockets to which they were connected were usually exposed and created dark spots in the reflected light. Light fixtures having such shadow lines and dark spots of this character detracted from their usefulness as decorative lighting devices especially when the tube and reflecting surfaces were exposed directly to view.

An important object of this invention is to provide a novel form of reflector and lamp support for fluorescent types of light fixtures which may be viewed directly without distress to the eyes and which throws a mass of original and reflected light from which all contrasting light and dark areas have been eliminated. As a result, an illusion is created of a continuous uninterrupted band of light extending the length and width of the reflecting surface. A further object of this invention is to provide novel reflecting surfaces for fluorescent lamps and the like which blend the intensity of the light source with the intensity of the reflected light to thereby eliminate any distinct line of demarcation between the lamp tube and the reflecting surfaces and the formation of dark areas where the ends of the tube are connected to the light sockets. As a result there is presented a target of light which is so broad and relatively uniform as to be pleasing to the eye with greater efficiency.

Another object of this invention is to provide a novel light fixture in the form of a unit which may be used alone or cooperatively associated with other units of the same type. The unit is provided with a novel form of bracket which supports the fluorescent tube substantially directly against the reflecting surfaces and in such a manner that the tube can be quickly assembled and detached from the unit. The reflector of these units are generally channel-shaped and provided with end walls bearing such a relation to the fluorescent tube that they create an illusion that they are part of the base portion of the reflecting surface across which the tube extends. When two or more of such units are aligned end to end, the illusion is created that the tubes in the respective units form one long continuous tube without any break between these two units. Similarly, the reflectors of two or more fixtures may be assembled side by side with the edges of the reflector abutting. The marginal portions of two abutting reflectors merge at such an angle that the reflected light of both fixtures is harmoniously blended without any noticeable interruption.

Another important object of this invention is to provide a novel support for flourescent tubes which enables the same to be mounted on a reflector unit with the non-luminous ends of the tubes concealed behind reflecting surfaces. The support is formed in a novel way to permit limited longitudinal shiftable movement of each tube with respect to its reflector unit. An important feature of this support is the ease and rapidity which the fluorescent tubes may be attached and removed from the reflector units without the necessity of gaining access to the rear of the reflector or adjusting or removing any parts thereof.

Figure 2:
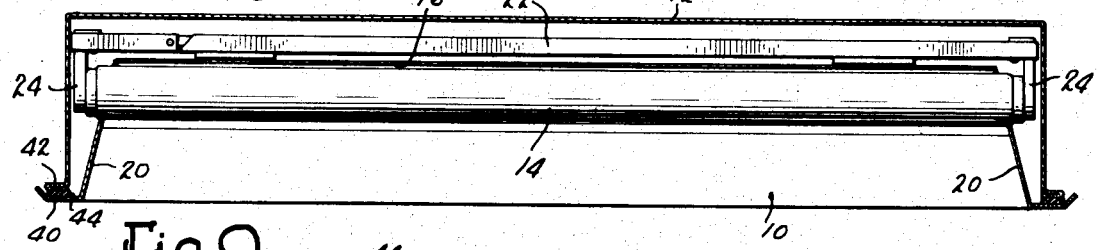
Figure 3:
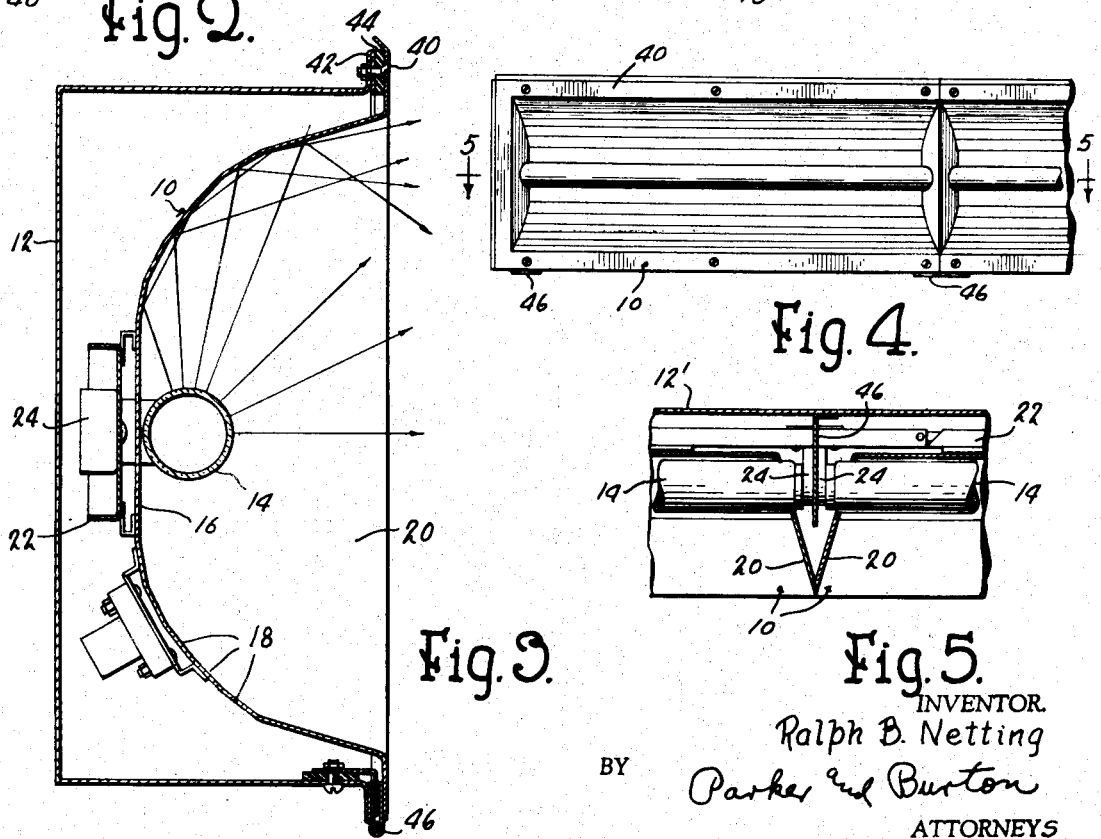
Figure 4:
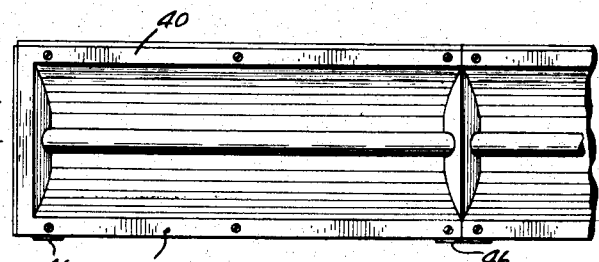
Figure 5:
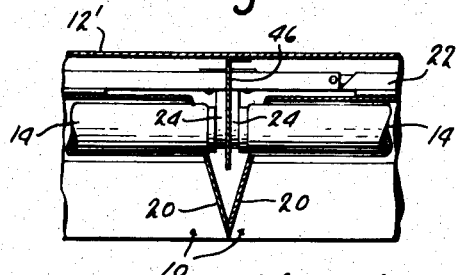

Various other objects, advantages and meritorious features will appear more fully from the following specification, appended claims and accompanying drawings, wherein:

Fig. 1 is a front elevation of a reflector unit showing the fluorescent tube in assembled position, Fig. 2 is a longitudinal sectional view of the unit along line 2—2 of Fig. 1, Fig. 3 is a cross-sectional view of the unit along line 3—3 of Fig. 1, Fig. 4 is a view of two such units assembled end to end, Fig. 5 is a detail view showing the manner of associating the units end to end to give the illusion of a continuous reflecting surface and tube, Fig. 6 is a detail sectional view of one end of a unit showing one manner of removably supporting the tube in proper position against the reflecting surfaces, Fig. 7 is a top view of the end of the unit along line 7—7 of Fig. 6, Fig. 8 is a sectional view of the end of the unit along line 8—8 of Fig. 6 showing one of the sockets for supporting the tube, Fig. 9 is a transverse sectional view through an alternative arrangement whereby the units are disposed in side by side abutting relation.

Figure 10:
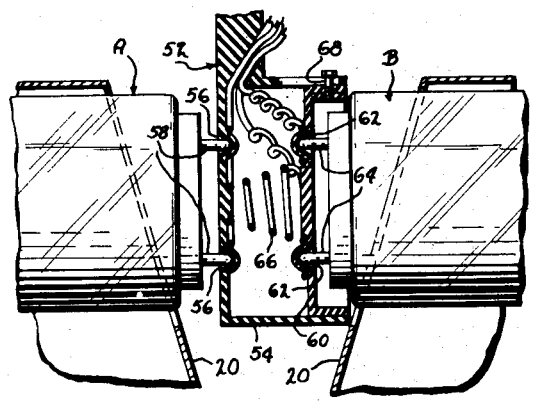
Figure 11:
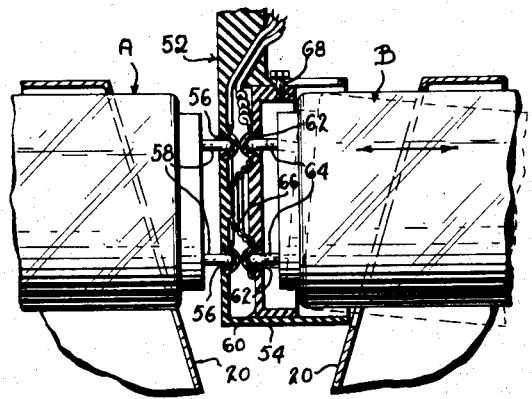
Figure 12:
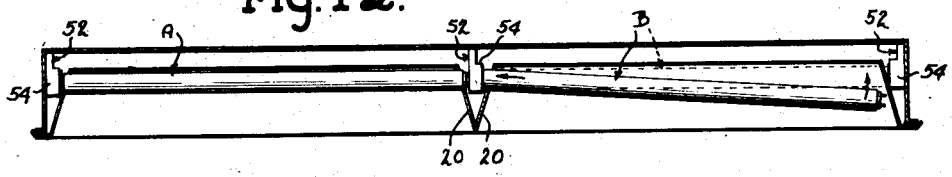
Figure 13:
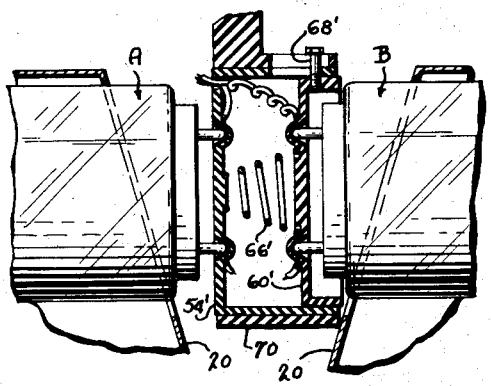
Figure 14:
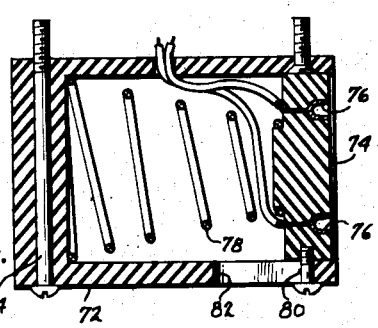
Figure 15:
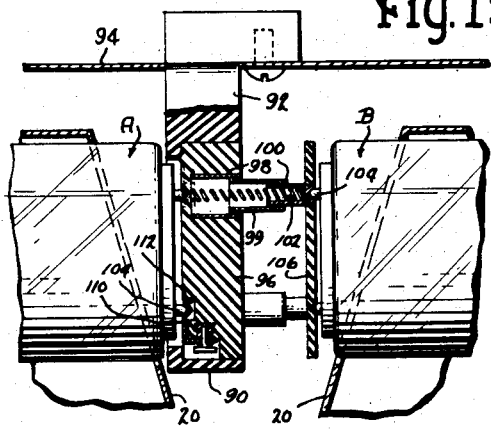
Figure 16:
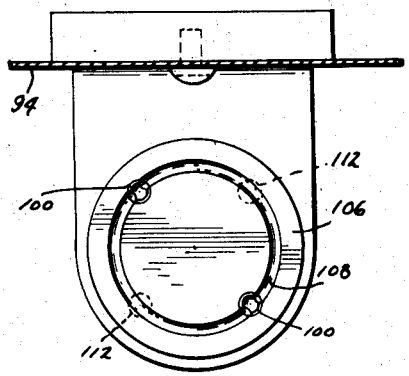

Fig. 10 is a view of a modified form of terminal connection for the fluorescent tubes, enabling the same to be inserted and removed from the sockets without going to the rear of the reflector, Fig. 11 is a view similar to Fig. 10 but showing another position of the parts in the terminal connection, and Fig. 12 is a view in small scale showing how the terminal of Figs. 10 and 11 function to assist in the attachment and removal of fluorescent tubes, Fig. 13 is a sectional view of another form of terminal mounting for two fluorescent tubes, Fig. 14 is a sectional view of another terminal mounting for a single fluorescent tube, and Figs. 15 and 16 are longitudinal and cross sectional views respectively of another form of terminal mounting for two fluorescent tubes.

The light fixture in the present invention is primarily intended for fluorescent type of lamps in the form of long tubes but it is understood that many of the features of the invention are applicable to other types of light fixtures.

Referring to the drawings, the embodiment of the invention illustrated is in the form of a unit which provides quick installation and removal of the light source. It comprises a reflector generally indicated at 10 disposed within a rectangular casing 12. A light source in the form of a fluorescent tube is indicated at 14. The casing 12, although shown in the illustrated embodiment of the invention, may be dispensed with if desired.

To obtain the continuous unbroken spread of light from the tube and reflector, the reflector is shaped with novel reflecting surfaces which when the tube is disposed in proper relation thereto blends or harmonizes the respective intensities of the tube and reflecting surfaces so that no alternately dark and light areas can be observed. The reflector 10 is provided with a flat base portion 16 of a relatively wide width extending the length thereof. It is wider than the tube 14 as evident in Fig. 3. Preferably for the embodiment illustrated, its width is approximately three times the diameter of the tube but this is not necessarily so in all cases.

The opposed sides of the reflector 10 are shaped in a novel way to spread the light without distinct shadowing effects and at the same time create a pleasing decorative appearance. As shown in Figs. 1 and 3, each side of the reflector is divided longitudinally into a series of relatively narrow flat bands 18 each extending at a slight angle to its neighbor and all extending at a progressively greater angle to the base portion 16 as the outer margins of the reflector sides are approached. These bands have a width preferably about one-half the diameter of the tube. They bear such an angle to one another that the sides of the reflector gradually extend further and further away from the luminous tube. When the unit is on a wall or ceiling and viewed from a distance the effect is a series of regular strips of reflected light on opposite sides of the tube gradually decreasing in intensity from the base of the reflector outwardly but without any sharp shadowy or dark areas appearing to mar the luminous background.

An important feature of the invention contributing to the desired effect is the location of the tube with respect to the reflecting surfaces. Instead of being spaced from the reflecting surfaces as heretofore, it is positioned substantially against the reflecting surfaces. When spaced therefrom distinct bands of reflected light of less intensity appear on opposite sides of the luminous tube giving the effect of shadows which present the tube in sharp relief against the reflecting background. By disposing the tube directly against or very close to the type of reflector described herein, I have found that the intensity of light from the luminous tube blends harmoniously with the intensity of light reflected from the adjacent surfaces of the reflector. No dark areas can be observed immediately behind or adjacent to the tube when the unit is viewed generally normal to the plane of the base portion 16 of the reflector.

In the present embodiment of the invention the tube 14 is disposed substantially directly against the flat base portion 16 of the reflector and on the centerline thereof so that equal parts of the base portion extend from opposite sides of the tube. The tube may contact the reflecting surface or be spaced a very slight distance therefrom as indicated in Fig. 3. This gains the desired effect previously explained.

In order to support the tube in close proximity to the reflector and conceal unsightly electrical connections on the ends thereof, the reflector is provided with novel end walls or plates shaped to receive the ends of the tube and create the illusion that the walls are parts of the reflecting background over which the tube extends. The walls are indicated at 20. Each consists of a flat plate having inner reflecting surfaces of the character of the base and side portions of the reflector. Each plate is inclined outwardly away from the base portion 16 to a level even with the margins of the side portions of the reflector. The plates are each provided at a point close to the base portion 16 with an aperture just slightly oversize the tube 14 so that the ends of the tube may be readily inserted and, importantly, so that the annular space between the tube and the edge of the aperture in the end reflecting wall 20 will not present the undesirable appearance of a black ring or deep shadow. These apertures are in alignment with one another opposite the centerline of the base portion. The tube is of such a length that its ends will extend into the space behind the inclined plates. The inclination of the plates is such that when the tube is functioning an illusion is created that there is a continuity of reflecting surface from one end of the unit to the other. This is important as will be later described when several units are mounted end to end or side by side.

The casing 12, which as previously mentioned is optional, is of such a size with respect to the reflector that enclosed spaces are formed in the rear of the base portion 16 and the end walls 20 which may be used to house electric auxiliaries necessary for the proper functioning of the fluorescent tubes. Extending along the back side of the reflector opposite the flat base portion is a bracket 22 which serves to support the fluorescent tube 14 in proper position. In the instance of incased units, the bracket may also house the auxiliaries necessary to operate the fluorescent light source. The ends of the bracket extend beyond the ends of the base portion 16 to points opposite the spaces behind the end walls 20. On the extremities of the bracket are socket members 24 which project into the area behind the end walls 20 in line with the apertures therein. These sockets are conventional in construction. Referring to Fig. 8, each is provided with a circular slot 26 and a straight slot 28 crossing the former. A pair of terminal pins or studs 30 on each end of the tube first enter the straight slot one behind the other and then when in the circular slot the tube can be turned to swing the pins to the position shown in Fig. 8. In this position the pins are releasably held by flexible blades 32 forming an electrical connection for the tube. The sockets 24 may be secured to the bracket in any desirable way such as by screws 34 in Fig. 7.

Preferably the reflector 10 and the casing 12 are secured together by providing each with marginal flanges and fastening the flanges together. A suitable form of connection is shown in Fig. 3. The reflector is provided with flanges 40 on each side of the reflector and also on the end walls if the unit is to be used alone. The casing likewise is provided with flanges 42 on all sides. Suitable fastening means such as bolt and nut assemblies are used to secure these flanges together but preferably the flanges are maintained in spaced relation by yielding insulating material 44. Instead of fastening bolts all the way around the unit, one side of the reflector may be hinged to the casing in order that after the bolts on all other flanges are removed, the reflector can be swung out of the casing on the hinge. Such a hinge construction for one side of the unit is generally indicated at 46 in Fig. 3.

As previously described, an important feature of the invention relates to the assembly of two or more of these reflecting units either in end to end or side by side abutment. When mounted end to end, the end walls 20—20 of each unit contribute to create an effect that the assembly is one continuous uninterrupted source of light and not an assembly of separate units. When assembled end to end, it is desirable to leave off the flanges 40 and 42 on the abutting ends of the units. This will bring the inclined end walls 20 of two adjacent units to an apex as illustrated in Fig. 5. The inclination at which the two abutting end walls 20 extend and the concealment of the terminals of the tubes 14 therebehind create the illusion that there is a continuity of reflecting surface of one unit to the reflecting surface of the next adjacent unit. The effect to the eye is one continuous reflecting surface and one continuous light source extending without break from one end of the assembled units to the other. The angle of inclination of the end walls 20 is important. Preferably for the embodiment of the invention illustrated the angle of each end wall to the background is 73°.

For end to end assembly, an elongated casing embracing all the units may be used. Such a casing is illustrated in Fig. 5 at 12'. The end walls of this casing are omitted and in place a bracket plate 46 may be used to align the sockets 24 in proper position.

The reflecting units may be disposed in side by side abutment as previously mentioned. In this instance as in the case of end abutment, it is desirable to leave off the flanges 40 and 42 so that the abutting edges meet at an apex. The result is that illustrated in Fig. 9 where two units are shown in side by side abutment. Any additional number of units may be mounted in this way, if desired. The angles at which the abutting surfaces are brought into engagement is important. It carries over the reflected light from one unit to the other so that no break appears to the eye along the line of juncture. For the illustrated structure the preferred angle at which the abutting edge of each unit extends to the plane of the assembly is 70°.

For readily removing the tube from each unit, the bracket 22 may be preferably constructed in two sections, one which extends the greater part of the length of the unit and the other which is short and hinged to the longer section. The short hinged section is indicated at 48. It is capable of being swung when the reflector is removed from the casing to a position indicated by the dotted lines in Fig. 6. The hinge pin connecting the two sections is indicated at 50.

An alternative novel mounting for the fluorescent tubes which is especially desirable for encased units firmly held in place is illustrated in Figs. 10, 11 and 12. The attachment and removal of the tubes in this form of mounting is accomplished by the provision of at least one socket for each unit which will allow the tube mounted therein to shift bodily lengthwise a limited distance sufficient to insert or remove first one end and then the other end of the tube either into or from the apertures in the end walls of the reflectors. This simplifies the attachment or removal of the tubes. To install, the operator merely grasps the tube with his hands and introduces one end into a hole in one of the end walls and then upon bodily shifting the tube further into the hole beyond which it will normally extend, the other end will clear the end wall so that it can be swung into alignment with the hole therein and shifted bodily thereinto. The sequence is reversed for removing the tube. There is thus no necessity of gaining access to the rear of the reflector or adjusting or removing parts of the unit.

In Figs. 10, 11 and 12 the novel type of socket is applied to an assembly of units mounted in end to end relationship but the same or similar type of socket may be used when only one unit is used or where the units are arranged in side-by-side abutment. In the illustrated form the novel type of socket 52 is mounted as in the previously described embodiment of the invention in the space between the converging end walls 20—20 of abutting reflector units. It is a single unit having two sets of contacts disposed back to back and facing in opposite directions toward the apertures in the end walls for receiving the terminals on the fluorescent tube introduced into the apertures. One set of contacts is supported against movement; the other set has a permitted movement toward and away from the fixed set.

Referring specifically to Figs. 10, 11 and 12, the socket 52 comprises a fixed member 54 in the form of a cup and preferably composed of insulating material. The bottom section of this cup-shaped member is indented at two points to form tapering recesses 56—56. These recesses are lined with electrical conductive material and serve as contacts for receiving the terminals 58 on the tube designated as A. Reciprocating in the cup-shaped member is a movable member 60 likewise formed of insulating material and likewise indented at 62—62 to form metal lined contacts for receiving the terminals 64 of the tube designated B. Within the cup-shaped member 54 is a coil spring 66, preferably of conical formation. It is seated at one end against the bottom of the cup-shaped member 54 and at the other end against the movable member 60 and as is obvious from the drawings will exert a yielding force tending to separate the two members. A pin 68 fixed in one of the members and extending through a slot in the other member limits the travel of the movable member relative to the fixed member.

Figure 12 illustrates how sockets 52 function to allow rapid attachment and removal of the fluorescent tubes. In the left reflector unit of Fig. 12 the tube is already installed and assumes its proper position. In the right unit, the tube is shown in full lines with one end inserted fully into the socket 52 shifting the movable member 60 inwardly against the resistance of the spring 66. In this position, the other end of the tube will clear the end wall and the tube can be swung to the dotted position and then shifted to introduce the end into the end wall of the reflector. This will bring the right end terminals into engagement with the contacts 56—56 in the fixed member 54 of the socket at the right end of the assembled units. The coil spring will force the movable member 60 of the middle socket outward to follow the tube and maintain contact. The reverse procedure is followed to remove a tube from its reflecting unit.

In Fig. 13 I have shown a modified form of socket of the type in Figs. 10 and 11 which permits movement of both terminal carrying members relative to one another and the reflector units. The arrangement is similar to that described in connection with Figs. 10 and 11. The cup-shaped member referred to as 54' is allowed a limited slidable movement in a sleeve 70 supported in any suitable way from the bracket or casing. As in the socket 52 of the preceding modification, the inside member 60' is permitted limited movement relative to the cup-shaped member. A coil spring 66' normally separates the two members their maximum distance. To allow shifting of both members but at the same time limit their movement and keep the parts from falling out of the sleeve, a pin 68' is provided which is fixed to member 60' and extends through slots in both the member 54' and the sleeve 70. It is obvious from the construction described that either terminal carrying member of the socket is shiftable axially toward or away from the other to effect attachment and removal of the tubes 14. Preferably the tube which engages the terminal member 54' is assembled in its reflector unit before the end of the other tube is brought into engagement with member 60'. This will fix member 54' against movement toward the left in Fig. 13 and dispose the other member 60' in operating position. Suitable references might be provided on the members to indicate which of the two should be first engaged by the tubes.

In the two forms illustrated in Figs. 10 to 13, the socket assemblies should be disposed all in one way for each line of reflector units. In addition, the sockets should be aligned so that the terminal recesses 56—56 and 62—62 are disposed in the same plane.

In Fig. 14 there is illustrated a spring pressed terminal socket for the end of a single tube. It comprises a fixed cup-shaped member 72 of insulating material. Slidable in this member is a plug 74 of insulating material. Two metal lined recesses 76—76 are formed in the outside face of the plug to serve as contact terminals. Inside the cup-shaped member is a spring 78 yieldingly forcing the plug 74 to its outer position. A pin 80 fixed to the plug rides in a slot 82 in the member 72 and limits the travel of the plug as in the previously described modifications. The closed end of the cup-shaped member is made purposely thick and is provided with a hole through which a bolt 84 may extend to secure the socket in fixed position.

Another form of terminal mounting permitting bodily shiftable movement of two aligned fluorescent tubes is illustrated in Figs. 15 and 16. It comprises a collar 90 which is supported between the ends of two abutting reflector units in any suitable way such as by providing an extension 92 on the collar which projects through a slot in a bracket member 94 and is engaged with the opposite side thereof in the manner shown. The collar carries a removable electrical terminal unit 96, the body portion of which is formed of electrical insulating material.

The unit 96 is provided with two sets of terminals facing in opposite directions for engagement with the adjacent ends of two aligned fluorescent tubes. One set of terminals is capable of yielding comparatively larger distances axially of the fluorescent tube connected thereto and thereby providing bodily shiftable movement of the tube as it is assembled and removed from the reflector unit. The other set of terminals is comparatively non-yielding. The unit 96, including the terminals, is designed to fit into a narrow space between the inclined end walls of two abutting reflector units. To assist in the accomplishment of this purpose, the terminal structures of one set overlap into the plane of the other but because of their angular disposition on the unit there is no interference. The cooperating terminal points on the fluorescent tubes are fore-shortened to economize in space.

Referring in detail to Figs. 15 and 16, the yielding set of terminals on the unit 96 are each formed of telescoping elements 98, 99 and 100 provided with overlapping end flanges which limit the maximum extension of the terminals. Inside of each telescoping series of elements is a coiled spring 102 which yieldingly urges the terminal into its most extended position. As shown in Fig. 15, the telescoping terminals project beyond the face of the unit to a point adjacent to the opening in the end wall 20 of one of the reflector units. The projecting end of each telescoping terminal is closed and recessed to receive the cooperating terminal pin 104 on the fluorescent tube designated B. To assist in guiding the pins 104 to the contact recesses of the telescoping terminals, a disc 106 of insulating material is supported on the projecting ends of the terminals and circularly grooved as indicated in Fig. 16 at 108 to guide the pins into the contact recesses. The opposite or base ends of the telescoping terminals are mounted in the insulating material of the unit 96 close to the opposite face thereof.

The set of terminals for the companion fluorescent tube A may be of any suitable design such as that illustrated comprising flexible metal strips 110 each having one end fixed to the face of the unit and the other end projecting over a recess 112 formed in the face of the unit. The free end of each strip is cup shaped to receive a terminal pin 104 projecting from tube A. When introduced thereinto the strip will yield slightly to form a firm electrical connection. The opposite end of tube A will be first received in telescoping terminals of the type of 98—100 and upon bodily shifting the tube to the left in Fig. 15, the end illustrated can escape past the edge of the opening in the end wall and line up with the contact 110.

To conserve space the terminals on one side of the unit 96 may be angularly disposed with respect to the other set as indicated in Fig. 16 in order that their respective planes of operation may overlap one another. To accomplish this, the terminals on one end of each fluorescent tube are disposed at an angle to the terminals on the other end, such as at the 90° angle illustrated in Fig. 16. Also for conserving space, the terminals may be fore-shortened until they are barely sufficiently long enough to enter the contact recesses as shown in Fig. 15. When the tubes are assembled in their respective units the telescoping terminals 98—100 are slightly collapsed as illustrated. When tube B is removed for example the telescoping elements will extend their maximum distance and carry the disc 106 to a point close to the opening in the nearest end wall 20.

A further novel feature of the invention is the prevention of color distortion in fluorescent lighting. The present fluorescent light sources are deficient in red light and tend to "wash out" reds from fabrics, etc., a particularly undesirable quality in merchandising stores and the like. It is therefore desirable to add red to the spectrum of the fluorescent light without filtering out any other colors. I have therefore found it desirable to add red coloring to the flat white paint used on the reflecting surfaces. This produces a reddish tint in the reflecting surface and adds a reddish glow to the light making up for the deficiency in the original source of fluorescent light.

What I claim is:

1. An electric fluorescent lamp comprising, in combination, a channel shaped reflector, a casing of general rectangular shape surrounding the back side of the reflector and enclosing the same in spaced relation to the base portion of the reflector, end plates on said reflector inclining downwardly and inwardly toward the base portion of the reflector providing a space between each end plate and the ends of the casing, a bracket extending the length of the reflector in the space between the base portion thereof and the casing, the opposite extremities of said bracket projecting beyond the ends of said base portion into positions opposite the spaces between the end plates and the ends of the casing, and electric terminal sockets for fluorescent tubes carried on the ends of the bracket and projecting into said spaces, said end plates provided with aligned apertures opposite the sockets into which the ends of a fluorescent tube may be advanced for attachment to said sockets.

2. An electric lighting fixture comprising, in combination, a fluorescent tube, a channel shaped member closed by walls at the ends having its inner surfaces provided with light reflecting material, said member having a flat base portion extending the length thereof and being wider in width than the fluorescent tube, apertures in the end walls of the member disposed in alignment closely adjacent to the base on substantially the centerline thereof, said apertures being slightly oversize that of the tube and adapted to receive the ends thereof, an elongated bracket member for supporting the tube extending along the back side of the base portion and projecting beyond the ends thereof, the projecting ends of said bracket carrying sockets projecting laterally therefrom to positions behind the end walls in alignment with the apertures therein, said sockets adapted to receive the ends of said tube when inserted in said apertures and electrically connect the tube with a source of electricity.

RALPH B. NETTING.